W. A. CHURCH.
CAR WHEEL.
APPLICATION FILED SEPT. 15, 1908.

935,962. Patented Oct. 5, 1909.

Witnesses:
Frank L. Graham
Louis W. Gratz

Inventor:
Walter A. Church.
by Townsend & Hackley
attys.

UNITED STATES PATENT OFFICE.

WALTER A. CHURCH, OF LOS ANGELES, CALIFORNIA, ASSIGNOR TO CHURCH DIFFERENTIAL CAR WHEEL COMPANY, OF LOS ANGELES, CALIFORNIA, A CORPORATION OF ARIZONA TERRITORY.

CAR-WHEEL.

935,962.

Specification of Letters Patent.

Patented Oct. 5, 1909.

Application filed September 15, 1908. Serial No. 453,180.

*To all whom it may concern:*

Be it known that I, WALTER A. CHURCH, a citizen of the United States, residing at Los Angeles, in the county of Los Angeles and State of California, have invented a new and useful Car-Wheel, of which the following is a specification.

This invention relates particularly to wheels for railway cars, and its main object is to provide a car wheel which will enable the wheel to move differentially with respect to the axle, as in rounding curves.

A further object of the invention is to provide for such differential movement of the wheel with a minimum of friction.

Another object of the invention is to provide for taking the end thrust, in both directions, of the wheel, with respect to the axle.

Another object of the invention is to provide for easy removal and replacing of the parts.

The accompanying drawings illustrate the invention:—

Figure 1:
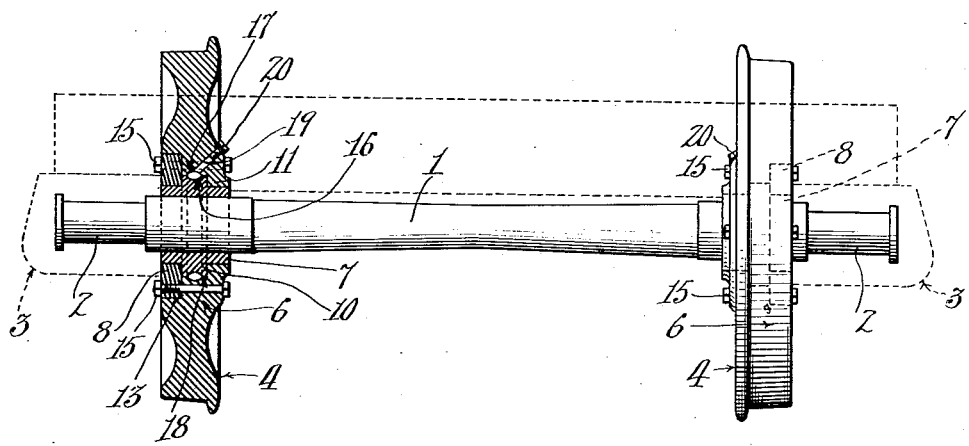
Figure 2:
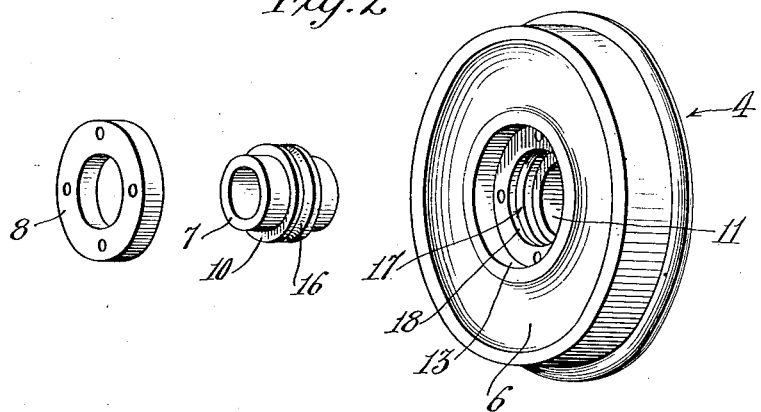

Figure 1 is an elevation of a car axle with wheels thereon, one of the wheels being shown in section. Fig. 2 is a perspective view, showing the parts of the wheel separate from one another.

1 designates a car axle, which at its ends may be provided with journal portions 2 to enter the usual journal boxes, indicated at 3 in Fig. 1, of a railway truck. Two car wheels 4 are provided for each axle, and each car wheel comprises a wheel body 6 having the usual tread and flange, a collar 7 adapted to be secured on the axle and serving as a support and journal for the wheel, and a retaining or clamp member 8. Journal collar 7 may be secured to the axle in any suitable manner, as by being forced thereon with a drive fit. Said collar has an annular flange 10 extending around the same intermediate its ends, and the wheel 4 has an inwardly extending annular flange 11, the inner end face or shoulder of which engages with an end face of the collar flange 10, the bore or circular opening of said wheel flange surrounding the collar 7 sufficiently close to enable the collar to serve as a journal or bearing for the wheel. The other or outer face of the car wheel is rabbeted or recessed as at 13, and the retaining member 8, formed as a ring, is seated in this recess and held therein by bolts 15, the said ring 8 extending inwardly to form a shoulder for engaging the outer face of the collar flange 10. The bore or circular opening of this ring 8 extends and works close to the circumferential face of collar 7 to serve as an additional bearing surface. Lubricating means are preferably provided, the circumferential face of the collar flange 10 having an annular groove 16 and a corresponding groove 17 being formed in the bore portion 18 of the car wheel, so that a suitable lubricant may be received in the annular channel formed by these grooves. For filling this channel, a passage 19 is formed in the car wheel leading from the face of the wheel to said passage, a screw plug 20 being provided to normally close said passage.

In operation, the axle may turn in the usual manner on the standard or regular bearings 3, so long as there is no undue friction in said bearings or any inequality of action on the two wheels. But in rounding curves, where the condition of traction tends to impart different angular velocities to the two wheels, one or both of the wheels will turn relatively to the axle so as to compensate for the difference in angular velocity without any grinding or cramping of the wheels on the track, thus eliminating the loss of power and unnecessary friction, and also avoiding the objectionable wear on the wheels and track due to the skidding and rubbing of one or both wheels upon the track. In such operation of the car wheel relatively to the axle, the wheel turns on the collar 7, the circumferential faces of said collar and of its annular flange serving as a bearing to take radial or lateral thrust or strain, and the end faces of the collar with the coöperating faces or shoulders of the car wheel and of the retaining ring serving to take the end thrust.

What I claim is:—

1. A car wheel comprising a wheel body, a collar having an axle receiving bore and a circumferential flange, said wheel having a flange extending inwardly at one side of the collar flange, and a retaining ring member secured to the wheel and extending inwardly therefrom at the other side of the collar flange.

2. A car wheel comprising a wheel body having a circular opening with an inwardly extending flange at one end thereof, a retaining ring detachably secured to said wheel body and extending inwardly at the other end of said opening, and a collar extending in the opening and having a circumferential flange extending between the said wheel flange and the said retaining ring member.

3. A car wheel comprising a wheel body, a collar having an axle receiving bore and a circumferential flange, said wheel having a flange extending inwardly at one side of the collar flange, a retaining ring member secured to the wheel and extending inwardly therefrom at the other side of the collar flange, the said collar having a circumferential groove, and the wheel being provided with a passage for admitting lubricant to said groove and with a closure for said passage.

In testimony whereof, I have hereunto set my hand at Los Angeles, California, this 1st day of September, 1908.

WALTER A. CHURCH.

In presence of—
P. H. SHELTON,
FRANK L. A. GRAHAM.